Nov. 12, 1940.  A. R. WEIS ET AL  2,221,225
BALANCING AND LEAKAGE DEVICE FOR CENTRIFUGAL PUMPS
Filed April 16, 1938

ARTHUR R. WEIS
GEORGE E. BIGELOW   INVENTORS.
BY
ATTORNEY.

Patented Nov. 12, 1940

2,221,225

UNITED STATES PATENT OFFICE 2,221,225

BALANCING AND LEAKAGE DEVICE FOR CENTRIFUGAL PUMPS

Arthur R. Weis and George E. Bigelow, Huntington Park, Calif., assignors to Pacific Pump Works, Huntington Park, Calif., a corporation of California Application April 16, 1938, Serial No. 202,500

3 Claims. (Cl. 103—112)

Our invention relates in general to balancing and leakage restricting means of the type used in high pressure, multi-stage rotary pumps, and relates in particular to a non-seizing, floating type balancing and leakage device especially suitable for use in hot oil centrifugal pumps.

Since the invention is of especial utility in pumps employed for the pumping of hot oil from one stage of a refining process to another, we shall, for the purpose of simplifying this disclosure, limit the description to this cause. Where centrifugal pumps are employed to pump hot liquids, heat transmitted to the packing produces a condition which is not conducive to greatest efficiency in the operation of the packing, and in hot oil pumps especially, the relatively great destructive action of hot oils on the packing materials has resulted in the use, in high pressure centrifugal pumps for handling hot oils, of a pressure reducing chamber between the high pressure or discharge end of the pump and the packing means which is disposed around the end of the shaft at the high pressure end of the pump. Between the interior of the pump and the pressure reducing chamber, a leakage or leakage restricting device is placed around the shaft to permit a small leakage of hot oil from the high pressure space of the pump to the pressure reducing chamber, but this leakage device is intended to keep the leakage as small as possible without applying material friction to resist rotation of the shaft. Such leakage device is generally in the form of a balancing drum of cylindrical form secured to the shaft in a position to rotate within the bore in the dividing wall between the high pressure space of the pump and the pressure reducing chamber.

It is an object of our present invention to provide a balancing drum of such diameter as to effectively balance the end thrust on the rotating assembly of the centrifugal pump and having a floating, self-adjusting leakage control means incorporated therewith which will operate substantially indefinitely without seizing and substantially without wear, owing to the fact that it has the inherent function of automatically adjusting itself to proper operating position as the balancing drum tends to shift laterally due to the relative expansion and contraction of the pump parts. Ordinary cylindrical balancing drums must be given a relatively large clearance if they are to operate without seizing and they are susceptible to relatively rapid wear so that as the clearance increases, the leakage of fluid into the pressure reducing chamber correspondingly increases, this making it difficult to maintain the highest efficiency in pumps equipped with common balancing drums. With our present invention we are able to maintain the leakage past the balancing drum at a value which is from a quarter to a third of that which passes the ordinary cylindrical type of leakage drum. For example, in a comparative test in a centrifugal pump and at a pressure differential of one thousand pounds per square inch, the leakage past our self-adjusting balancing and leakage device was found to be 17½ gallons per minute; whereas, at the same pressure differential, the leakage past a standard cylindrical drum of substantially the same size was found to be 66 gallons per minute.

It is a further object of the invention to provide a balancing and leakage restricting means of the character set forth in the foregoing, wherein the balancing drum has an annular channel in the circumferential face thereof, this channel facing the wall of a bore in which the balancing drum rotates, and a self-adjusting leakage controlling ring in the annular channel, this ring being substantially non-rotatable in the bore, but being axially movable for automatic longitudinal adjustment as expansion and contraction of the pump parts may require.

It is a further object of the invention to provide a balancing and leakage device of the character set forth in the preceding paragraph, wherein the balancing drum is of stepped form and has an enlarged outer end fitting into a counterbore formed in the outer end of the bore in which the balancing drum rotates. The annular channel in the drum extends from a point within the smaller portion of the drum to a point within the larger portion thereof, and the inner end wall of the annular channel is smaller in diameter than the outer end wall of the annular channel. This construction makes it possible to obtain a relatively sensitive adjustment of the leakage control ring which is of stepped form corresponding to the form of the bore and the balancing drum. In addition to this sensitivity of automatic adjustment of the leakage control ring, the present invention has as a feature thereof the ability to use a self-adjusting leakage control ring of minimum size for a given diameter of balancing drum, or on the other hand a maximum size of balancing drum for a given diameter of leakage control ring.

A further object of the invention is to provide a self-adjusting balancing and leakage device of the character described, which may be removed from the discharge end of the pump housing for the purpose of inspection and replacement should the same be found necessary, and in which the balancing drum is formed of a pair of simple cooperative parts which abut on a plane passing through the annular channel and are held in operative alignment when secured on the pump shaft. A feature of this construction, as will be hereinafter explained in detail, is to facilitate and simplify the assembling of the cooperating parts of the balancing drum and leakage control means on the pump shaft, from the end of such shaft which projects from the discharge end of the pump.

Further objects and advantages of the invention will be brought out in the following part of the specification.

Referring to the drawing, which is for illustrative purposes only:

Figure 1:
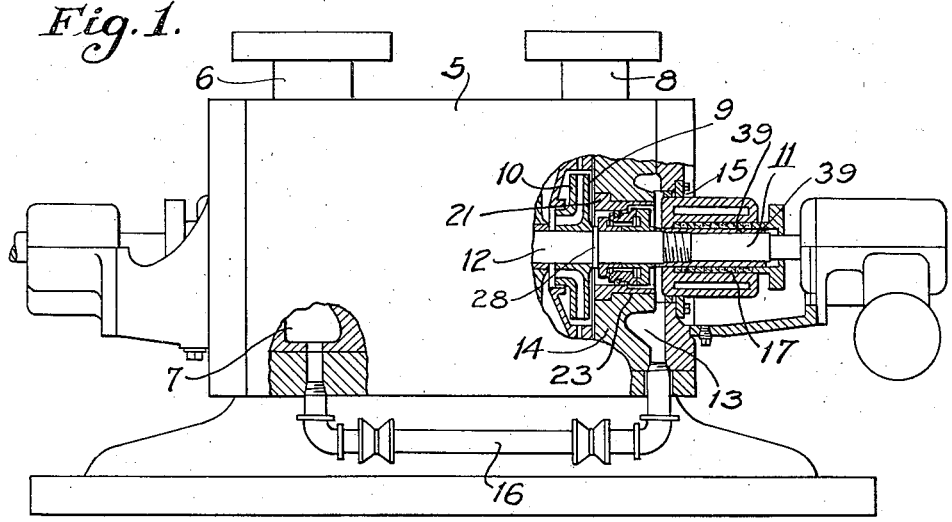
Fig. 1 is a partly sectioned elevational view of a hot oil centrifugal pump showing a preferred embodiment of our invention in use.

In Fig. 1 we show a pump 5 having an inlet 6 which is connected to an intake space 7 from which the pump impellers take the hot oil and discharge the same under high pressure through an outlet 8. The final impeller chamber 9, which encloses the final impeller 10, has therein during the operation of the pump a discharge pressure substantially the same as the pressure of the fluid which passes from the pump 5 through its outlet 8. To keep this high pressure of fluid in the space 9 from being exerted against the packing material employed around the projecting end 11 of the pump shaft 12, a pressure reducing chamber 13 is provided adjacent the high pressure space 9 and is separated from such space by a wall 14, having therein a leakage device and balancing member 15, which is shown to enlarged scale in Fig. 2. This leakage device 15 permits a small flow of fluid from the high pressure space 9 into the pressure reducing space or chamber 13, which is connected through piping 16 with a body of fluid existing at a lower pressure, for example, the piping is shown connected to the intake space 7 of the pump 5. Accordingly, the pressure of fluid applied to the packing 17 which surrounds the projecting end 11 of the shaft 12 can be no greater than the pressure in the intake space 7, and the packing 17, therefore, is not required to work against the high discharge pressure of the pump 5, but merely against the much lower pressure existing in the chamber 13.

Figure 2:
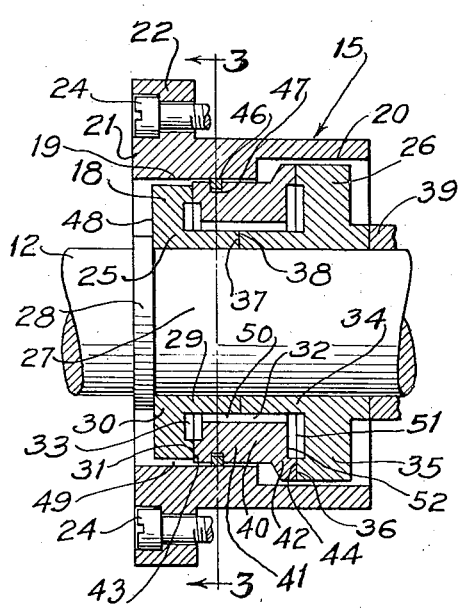
Fig. 2 is an enlarged sectional view of the preferred embodiment of our improved balancing and leakage device.
Figure 3:
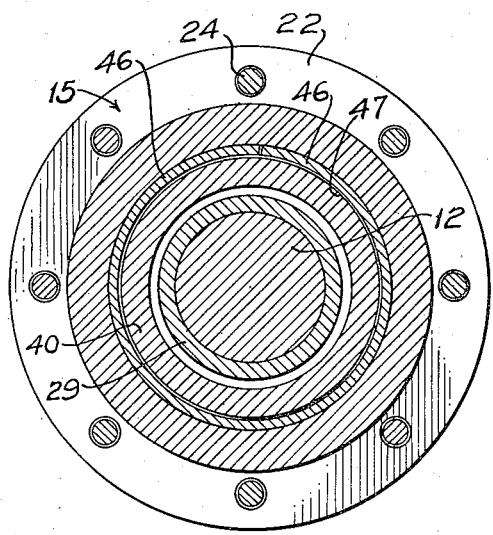
Fig. 3 is a cross section taken on a plane represented by the line 3—3 of Fig. 2.

As shown in Fig. 2, the leakage device 15 includes a balancing drum 18 which rotates within the bore 19 and counterbore 20 formed by a cylindrical fitting which is provided with a flange 22 and is secured in an opening 23 in the wall 14 of the pump 5 by means of screws 24. The balancing drum 18 is formed of an inner annular part 25, so called for the reason that it is closest to the interior space 9 of the pump 5, and an outer annular member 26, both of these members 25 and 26 being bored so that they will fit closely upon that portion 27 of the pump shaft 12 lying to the right of a collar 28 formed on the pump shaft.

The inner annular member 25 includes a cylindrical wall 29 from which a flange 30 projects radially outwardly, this flange 30 having a radial annular face 31 facing toward a channel 32 which is formed in the balancing drum 18 between the inner and outer parts 25 and 26 thereof, there being an annular recess 33 in the face of said flange 30 within the annular face 31. The outer annular member 26 has an inner cylindrical wall 34 from which a flange 35 projects radially outwardly, this flange 35 being materially larger in diameter than the flange 30 and being disposed within the counterbore 20. The flange 35 has an annular face 36 which is disposed in a radial plane and which faces toward the radial face 31 of the inner annular member 25 of the drum 18.

The inner annular member 25 rests against the shoulder 28 on the shaft 12, and the outer end face 37 thereof is engaged by the inner end face 38 of the outer annular member 26. The members 25 and 26 are forced tightly together and toward the shoulder 28 by means of a sleeve 39 which is threaded onto the outer end 11 of the pump shaft 12 and passes through the packing 17, in the manner shown in Fig. 1. The outwardly faced annular channel 32 is therefore formed in the balancing drum 18 when the cooperating parts 25 and 26 are assembled, and the channel is in a position to lie partly within the bore 19 and partly within the counterbore 20 of the cylindrical fitting 21. In this outwardly faced channel 32 a leakage control ring 40 is placed, this leakage control ring having an inner portion 41 which lies principally within the bore 19 and projects into the counterbore 20, and an outer portion 42 of larger diameter than the inner portion 41. The outer portion 42 lies entirely within the counterbore 20. The leakage control ring has an inner radial sealing face 43 disposed in abutting relation to the face 31 at the inner end of the channel 32, that is to say, at the leftward end of the channel 32, and an outer sealing face 44 in abutting relation to the radial face 36 at the outer or rightward end of the channel 32. It will be perceived that the outer sealing face 44 is larger in diameter than the inner sealing face 32, and so that the balancing drum may rotate, while the leakage control ring remains relatively stationary, the distance between the radial faces 43 and 44 is made slightly less than the distance between the annular faces 31 and 36 of the flanges 30 and 35.

The leakage control ring 40 is provided around its exterior with a sealing means which is shown in the form of an expansible piston ring 46 which is received in an annular channel 47 formed in the leftward or inner portion 41 of the leakage control ring 40, and is expanded against the wall of the bore 19. The status of the leakage control ring may be referred to as floating, for the reason that it may move axially in the bore 19 as the expansion and contraction of cooperating pump parts results in axial movement of the balancing drum 18 within the bore and counterbore of the fitting 21. The term "floating" is especially applicable to the leakage control ring 40 for the reason that during normal operation of the pump, the leakage ring will not engage the radial faces 31 and 36 of the balancing drum 18, the action of fluid pressures thereagainst being such as to cause the ring 40 to assume a centralized position between the faces 31 and 36.

When the operation of the pump 5 is started, fluid pressure builds up in the chamber 9. The pressure of this fluid is exerted against the inner end face 48 of the balancing drum 18 to apply thereagainst a thrust in outward or rightward direction to balance the leftward thrust of the pump impellers. The pressure of this fluid is likewise applied in the annular space 49 around the flange 30 and that portion of the leakage control ring lying to the left of the sealing ring 46. Such pressure in the annular space 49 forces the leakage control ring outward or rightward a sufficient distance to permit entry of fluid between the faces 31 and 43 into the annular space 50 formed between the inner portion of the leakage control ring and the walls 40 of the members 25 and 26 which form the channel 32 of the balancing drum 18. The pressure of the fluid which has so entered the annular space 50 is immediately transmitted to the radial, annular space 51 existing at the rightward end of the leakage control ring 40, and therein exerts a leftward pressure against the face 52 at the rightward end of the leakage control ring 40, to offset the pressure which is exerted against the leftward end of the leakage control ring. Owing to the fact that the rightward end 42 of the ring 40 is of greater diameter, and therefore of greater area, than the leftward end of such ring 40, this ring 40 will be forced positively in leftward or inward direction until the faces 44 and 36 are separated sufficiently to permit an escape of fluid from the annular space 51 into the counterbore 20 which communicates directly with the pressure reducing space 13. At the same time there will be a closing of the space between the faces 31 and 43 so that there will be a greater pressure drop in the fluid entering the annular space 50, and a condition will be immediately reached wherein the leakage control ring will be spaced from the radial faces 31 and 36 by the film of oil which flows respectively inwardly and outwardly through the entrance and discharge openings of the annular channel 50 which then exist between the faces 31 and 43, and the faces 44 and 36.

The sensitiveness and responsiveness of the floating leakage control ring to changes in position of the balancing drum 18 is believed to be chiefly due to the stepped form of the exterior of the leakage control ring 40. The outer end of the ring 40 may be readily made sixty per cent larger in area than the inner end thereof. With such proportioning of the parts, the leakage control ring 40 is immediately responsive to pressure exerted in the space 51 at the rightward end of the ring 40, and any flow of oil under pressure into the leftward end of the annular space 50 may immediately find relief to the exterior from the rightward end of the annular space 50 as the result of the leftward movement of the ring 40. Accordingly, the control ring 40 is held in floating position between the radial faces 31 and 36 by fluid pressures acting thereon, the result being that the spaces between the end faces 31 and 36 of the balancing drum 18 and the faces 43 and 44 of the leakage control ring 40 may be made very thin, and may be maintained in this state for long periods of time owing to the fact that there is substantially no wear on the radial faces 31, 36, 43 and 44.

We claim as our invention:

1. In a balancing drum and leakage controlling device of the character described, for use on a shaft which extends in a rotary pump from a high pressure zone to a low pressure zone, the combination of: a wall between said zones having an opening comprising a cylindrical bore through which said shaft passes; a balancing drum secured on said shaft for rotation therewith in a position projecting within said bore from said low pressure zone, said drum having an inner flange positioned within said bore and an outer flange of larger diameter than said inner flange positioned in said low pressure zone, there being an annular recess between said flanges; a leakage control ring in said recess having an axial dimension slightly less than the axial dimension between said flanges, said ring having the front end extending within said bore and the rear end of larger diameter than said front end lying in said low pressure zone and the rear end face of said ring being of larger diameter than the front end face thereof, said front and rear ends being in juxtaposition with said inner and outer flanges respectively, and sealing means disposed between said ring and the wall of said bore permitting axial movement of said ring in said bore and preventing relative rotation of said ring during normal operating conditions of said pump but permitting rotation of said ring in the event of excessive friction between said ring and the flanges of said balancing drum.

2. A balancing drum and leakage controlling device for use on a rotating shaft extending from a high pressure zone to a low pressure zone in a rotary pump comprising a wall between said zones having an opening therein defining a cylindrical bore through which the shaft passes, a balancing drum secured on said shaft for rotation therewith, said drum embracing an inner flange positioned within said bore, an outer flange of larger diameter than said inner flange positioned in said low pressure zone, and an annular recess between said flanges, a leakage control ring in said recess having an axial dimension slightly less than the axial distance between said flanges, the inner end of said leakage control ring projecting into said bore and the outer end of said leakage control ring being of larger diameter than the inner end and lying in said low pressure zone, said inner and outer ends of said leakage control ring being in juxtaposition with said inner and outer flanges respectively, and a resilient sealing ring interposed between said leakage control ring and the wall of said bore, said resilient sealing ring functioning to prevent relative rotation of said leakage control ring with respect to said bore during normal operating conditions of said pump but to permit rotation of said leakage control ring in the event that it encounters excessive friction with the flanges of said balancing drum.

3. In a balancing drum and leakage controlling device of the character described for use in a rotary pump between a high pressure zone and a low pressure zone, the combination of: a wall between said zones having an opening comprising a cylindrical bore through which said shaft passes; a shaft extending through said bore, said shaft having a rearwardly faced shoulder contiguous to said bore; a balancing drum secured on said shaft for rotation therewith and positioned against said shoulder, said drum comprising an inner part having an inner flange thereon positioned within said bore and an outer part having an outer flange positioned in said low pressure zone, said outer flange being of larger diameter than said inner flange and there being an annular recess between said flanges; a leakage control ring in said recess having an axial dimension slightly less than the axial dimension between said flanges, said ring having a front end extending within said bore and a rear end of larger diameter than said front end lying in said low pressure zone, and the rear end face of said ring being of larger diameter than the front end face thereof said front and rear ends being in juxtaposition with said inner and outer flanges respectively; and sealing means disposed between said ring and the wall of said bore, permitting axial movement of said ring during normal operating conditions of said pump but permitting rotation of said ring in the event of excessive friction between said ring and the flanges of said balancing drum.

ARTHUR R. WEIS.
GEORGE E. BIGELOW.